Aug. 18, 1970   F. W. AINSWORTH ET AL   3,524,612
CRAFT ALTITUDE CONTROL APPARATUS
Filed Sept. 27, 1967   2 Sheets-Sheet 2
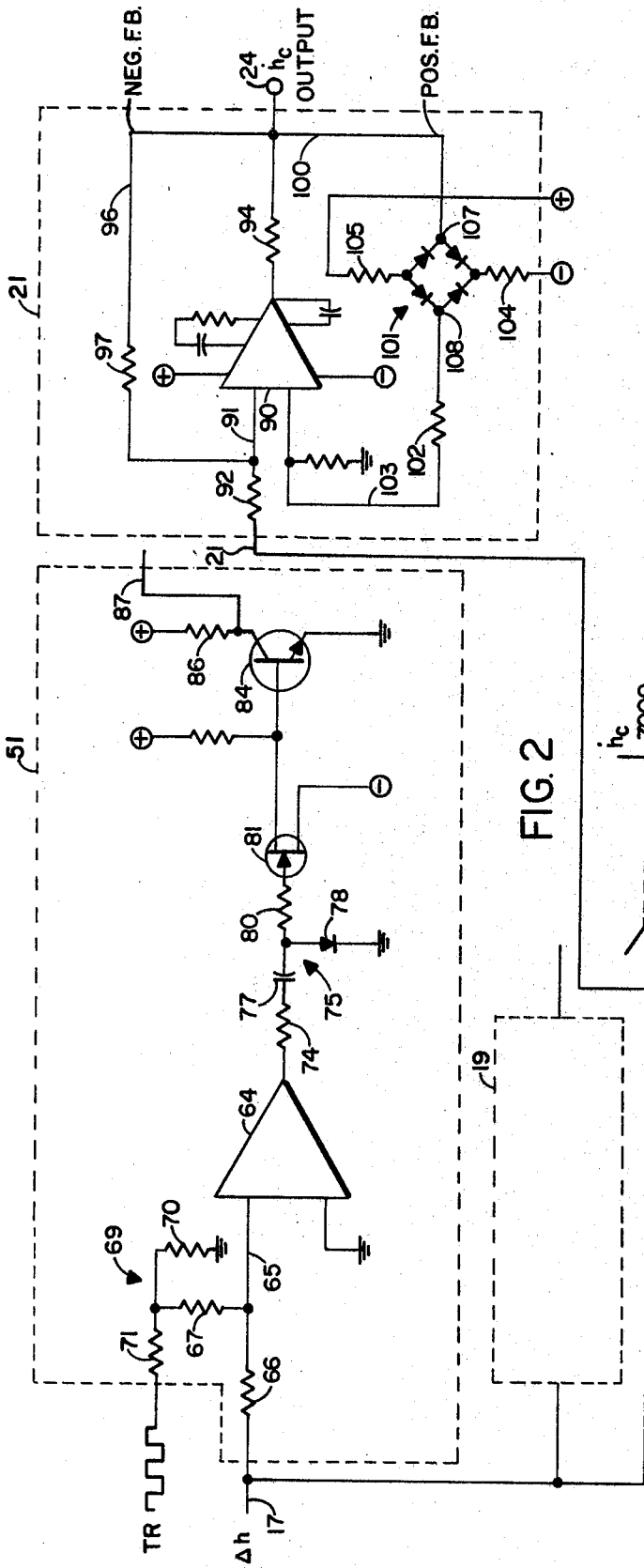
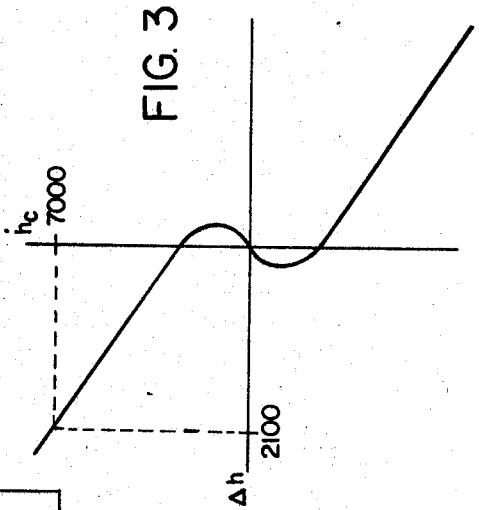
INVENTORS
FRANK W. AINSWORTH
GORDON O. HANDBERG
BY
ATTORNEY United States Patent Office 3,524,612
Patented Aug. 18, 1970

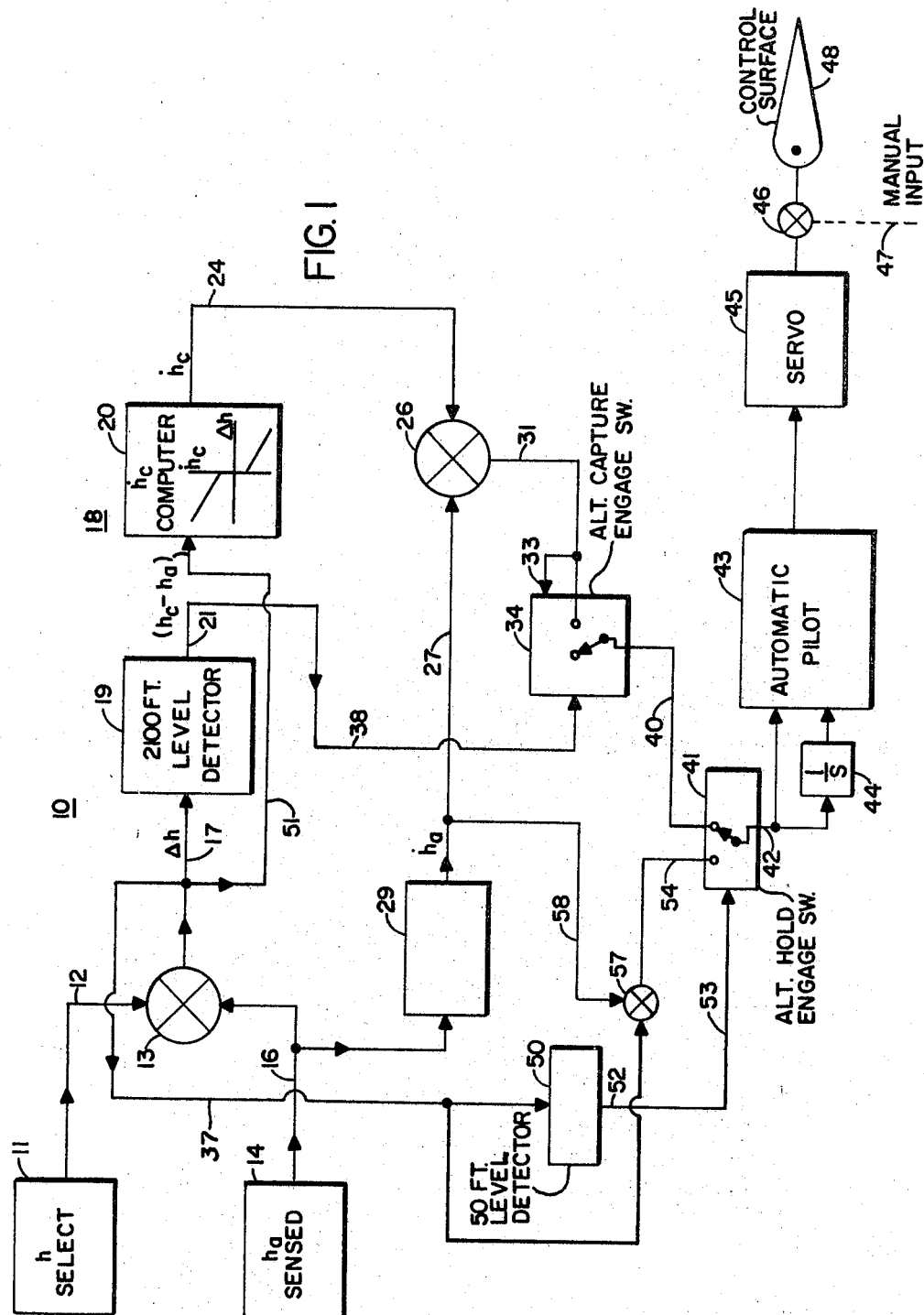
FIG. I
INVENTORS
FRANK W. AINSWORTH
GORDON O. HANDBERG
BY
ATTORNEY

3,524,612
CRAFT ALTITUDE CONTROL APPARATUS
Frank W. Ainsworth and Gordon O. Handberg, Minneapolis, Minn., assignors to Honeywell Inc., Minneapolis, Minn. a corporation of Delaware
Filed Sept. 27, 1967, Ser. No. 670,938
Int. Cl. B64c 13/18
U.S. Cl. 244—77
10 Claims

ABSTRACT OF THE DISCLOSURE

The altitude control for an aircraft includes (a) an altitude capture mode and (b) an altitude hold mode both for climb or descent.

---

The invention herein described was made in the course of or under contract AF 33(657)–15053 or subcontract thereunder, with the United States Air Force.

The altitude control apparatus is so arranged that the aircraft will fly from an existing altitude to a desired altitude with the assurance that the aircraft will have a velocity or altitude rate that causes it to cross the desired or preselected altitude. The altitude change control following the selection of a desired altitude and supplying a signal by which the altitude rate may be initiated, includes an altitude capture mode. Thus when the aircraft is short of the desired altitude by 2100 feet, a computed altitude rate and the aircraft actual altitude rate are compared and once the difference attains zero a switching operation occurs and the difference is used thereafter to control the craft altitude change rate.

When the aircraft is, while under control by the difference of the commanded altitude rate and the actual altitude rate, short of the preselected altitude by say, 50 feet, a level detector switches to the altitude hold mode for the craft following which switching by the detector, the aircraft is controlled by the altitude error and the craft actual altitude rate signals.

OBJECT OF THE INVENTION

This invention relates to position control apparatus and particularly to altitude control apparatus for aircraft to aid in approaching and thereafter maintaining a selected altitude.

It is a further object of the present invention to provide apparatus for automatically approaching and attaining a predetermined selected altitude and thereafter maintaining such preselected altitude, all such automatic functions occurring after the altitude of the aircraft is within a predetermined distance of a desired altitude.

It is a further object of the present invention to provide improved apparatus for controlling an aircraft to a selected altitude which, following selection of a predetermined altitude for the craft and setting in the desired rate of change of altitude of the craft when the altitude error is of predetermined magnitude automatically without further pilot effort captures the selected altitude.

A further object of the present invention is to provide improved altitude control apparatus for attaining a preselected altitude wherein the aircraft has imposed thereon a rate of change of altitude despite attaining the preselected altitude.

The above and further objects and advantages of the invention will become apparent by referring to the following description in conjunction with the subjoined drawings wherein:

FIG. 1 is a block diagram of the preselected altitude control apparatus;

FIG. 2 shows one embodiment of components of the arrangement in FIG. 1 which components may not be conventional;

FIG. 3 shows the relationship of the input, $\Delta h$, to the output $\dot{h}c$ of a computer, in graphical form.

In the altitude control apparatus of FIG. 1, and assuming an increase in altitude to be gained, the pilot manually positions a selector or first means in accordance with a desired altitude, and thereafter manually supplies a controlled input from a second means whereby to determine the rate of change of altitude of the craft. Thereafter while the aircraft is increasing or changing altitude, the sensed altitude provided by a third means is compared with the preselected altitude, and when the difference $\Delta h$ is within a predetermined magnitude, as determined by a level detector, the altitude error signal is supplied to a computer which computes a commanded rate of change of altitude $\dot{h}c$.

This rate of change of altitude is compared with the actual rate of change of altitude of the craft $\dot{h}a$ to supply an altitude rate error signal. When the aircraft is within the predetermined altitude difference and the altitude rate error is zero, the altitude capture mode is introduced by a switching device so that the altitude rate error through the automatic pilot and its servo-motor modifies the rate of climb initially provided manually. The altitude capture mode continues even if the altitude rate error does not remain zero, through the switching device.

When the aircraft altitude error $\Delta h$ is within a small magnitude such as 50 feet for example, a second switching operation occurs as determined by a second level detector. The second level detector switches in to the automatic altitude hold mode wherein the automatic pilot is controlled down from the altitude error signal and an altitude rate signal. Altitude command rate computer has a residual value $\dot{h}c$ even when the altitude error $\Delta h$ is zero and thus ensures that the aircraft when controlled in accordance therewith will fly through the desired altitude thereby causing at least one overshoot of such altitude.

Referring to FIG. 1, the altitude control apparatus 10 comprises a selector 11 for selecting the desired or predetermined altitude at which the aircraft is to fly. An output signal from selector 11 is transmitted by conductor 12 to a signal summing or comparing device 13. Device 13 receives a second input from an altitude sensing device 14 which supplies its output through a conductor 16 to device 13. The difference between the two outputs to device 13 is the altitude error $\Delta h$ or the difference between the altitude commanded and the altitude attained.

The output $\Delta h$ of summing or comparator device 13 is supplied over transmission means 17 to a level detector 19 by conductor 51 to a command shaping function generator 20 and by conductor 37 to a level detector 50. Level detector 19 transmits an output to conductor 21 when the actual altitude of the craft is within a predetermined magnitude of the desired altitude, for example 2100 feet. The computer 20 computes a desired altitude rate or commanded altitude rate $\dot{h}c$. Altitude rate command is supplied to transmission means 24. The commanded altitude rate signal on transmission means 24 is supplied to a summing or comparing device 26 which receives as a second input the aircraft actual altitude rate signal on conductor 27. The actual altitude rate is supplied by member 29 which may actually sense the altitude rate of the craft or may derive an altitude rate signal from the sensed altitude signal from sensor 14 on conductor 16.

The summing device 26 supplies an altitude rate error which is the difference between the altitude rate commanded on conductor 24 and the actual altitude rate of the craft on conductor 27. The altitude rate error signal is supplied to conductor 31 and is applied to a switching device 34 such as a resettable latching relay. The switching device or latching relay 34 may be of the mechanical or electronic type and is controlled jointly from the output of detector 19 supplied from conductor 21, conductor 38 to switching device 34 and the altitude rate error supplied over conductor 33 to switching device 34 which is operated when the altitude rate error is zero and $\Delta h < 2100$ feet. Switching device 34 thereafter transmits the altitude rate error on conductor 31 to conductor 40.

The operation of switching means 34 thus is controlled from the detector 19 when the altitude error signal supplied thereto decreases to 2100 feet by transmitting its output over conductor 21, conductor 38 to switching means 34 and by the concurrent altitude rate error supplied over conductor 31, conductor 33 thereto. When the altitude error is within say 2100 feet and the altitude rate error on conductor 31 concurrently passes through zero the first time, switching means 34 is operated and is latched in operated condition to transmit to conductor 40 any subsequent altitude rate error signal. This signal is supplied through a second resettable-latching switching means, designated an altitude hold engage switch 41 when in the unenergized or unlatched condition to a conductor 42 which supplies both a direct input to automatic pilot 43 of the altitude rate error signal and also supplies such signal through an integrator 44 to the automatic pilot 43.

The automatic pilot it is understood additionally includes other signal sources such as a pitch attitude gyro for supplying pitch attitude signals or a pitch rate gyro for supplying a signal in accordance with the aircraft rotation rate about its pitch axis. The automatic pilot 43 in turn controls a servomotor 45 which applies its output to a summing device 46 which also received the manual input thereto from device 47. The output from summing device 46 operates the attitude control means or control surface 48 such as the elevator control surface of an aircraft to control pitch attitude. With the operation of switching means 34, the aircraft is locked or latched in the altitude capture mode wherein the altitude rate error $\dot{h}c - \dot{h}a$ through the automatic pilot 43 modifies the control supplied from manual means 47.

During the capture mode, the aircraft approaches the desired altitude decreasing $\Delta h$ and thus decreasing $\dot{h}c$. When the altitude error $\Delta h$ is within a predetermined magnitude such as 50 feet, a level detector 50 which receives the altitude error signal $\Delta h$ from conductor 37 supplies an output to conductor 52. The signal on conductor 52 is supplied to conductor 53 for control purposes of the altitude hold engage switch 41. Thus, when the altitude error is within 50 feet or some other selected magnitude, the altitude hold engage switch 41 moves to a position and is locked therein thereby disconnecting altitude rate error conductor 40 from output conductor 42 of switching means 41 thus ending the altitude capture mode. Instead, output conductor 42 is connected to output conductor 54 of a differential or summing device 57 having supplied thereto an actual altitude rate signal $\dot{h}a$ on conductor 58 extending from conductor 27 and the altitude error signal $\Delta h$ from conductor 37. Thus, the aircraft during the altitude hold mode has supplied to its automatic pilot 43 from conductor 42 the altitude error of the craft and the actual altitude rate.

FIG. 2 shows an embodiment of a level detector such as level detectors 19 or 50. Such level detector comprises a high gain, saturating-differential amplifier 64 arranged in open loop configuration circuitwise having an input conductor 65 which receives a control signal from an input conductor 17 through a resistor 66. Amplifier 64 is of the type that reaches saturation even for small signals. Such control signal may be the altitude error signal $\Delta h$. In addition, conductor 65 receives a square wave tracer signal through a resistor 67 connected at its remote end to an intermediate point of a voltage divider 69 having one resistive part 70 connected to signal ground and the other resistive part 71 connected to the tracer signal source.

The output from amplifier 64 is transmitted through a resistor 74 and rectifier 75 to signal ground. The rectifier includes a capacitor 77 and a forward conducting diode 78 in electrical series. The junction of capacitor 77 and diode 78 is connected through a resistor 80 to a first control electrode of a field effects transistor 81 consequently the control voltages are negative. A second electrode of transistor 81 is connected to a plus 5-volt source and a third electrode is connected to a minus 15-volt source. The output from the circuit that includes the field effects transistor which transistor output is maximum with no control voltage on its first electrode, is applied to the base of an NPN transistor 84. The emitter of transistor 84 is connected to signal ground and the collector is connected through a resistor 86 to a plus five voltage source. The output of the circuit, that includes transistor 84, is supplied at the junction between resistor 86 and the transistor collector. The output therefore appears on conductor 87 extending from the junction of the collector and the resistor 86.

As to the detector operation, when no altitude error signal $\Delta h$ is applied to conductor 65, but with the square wave tracer signal applied, amplifier 64 will have a saturated AC output of 15-volts peak amplitude but only will have its negative output applied to resistor 80, due to the shunting to ground of positive voltages by the action of diode 78. In other words, due to the forward conduction arrangement of diode 78, the negative voltage of the AC output is blocked from passage therethrough but the positive portion is grounded. The negative voltage now on resistor 80 from high gain amplifier 64 attains a relatively large magnitude, and thus the field effects transistor 81 is non-conducting and thus is in the OFF condition. This results in a positive 5 volts being applied to the base of transistor 84 resulting in full condition thereof and an output on conductor 87 so that for detector 50 the altitude hold mode remains engaged.

When the altitude error, for example in the case of detector 50, is above 50 feet or some similar finite magnitude, this steady positive DC altitude error input cancels in effect the magnitude of the negative half of the tracer square wave signal. This cancels the effect of the negative voltage and results in no negative voltage being applied to resistor 80 thereby resulting in the field effects transistor 81 becoming more or full conducting than with no altitude error $\Delta h$. This conduction of transistor 81 causes the base of transistor 84 to be negative with respect to its emitter and causes transistor 84 to become less or nonconducting thereby changing the transistor circuit output on conductor 87. Such output at this time is not sufficient to energize switching means 41. When the altitude error is 50 feet or slightly less, the tracer signal negative half-cycle is not cancelled. Transistor 81 has a lower conduction than with $\Delta h$ greater than 50 feet. Transistor 84 is substantially off thereby opearting switching means 41 which stays latched in operated condition to apply the altitude hold mode until reset, despite changes in altitude error $\Delta h$ above 50 feet for example.

In the signal level detector, the voltage divider 69 with its resistive elements 70, 71 is used to set the operating level for transistor 84 of the signal level detector for various magnitudes of altitude error on conductor 65. Thus the magnitude of the square wave signal applied through resistor 67 to amplifier 64 depends upon the relative values of resistive elements 70, 71. It will be evident that when resistor 70 is large compared with resistor 71 that a large square wave input is applied to conductor 65, consequently it will require a larger positive DC altitude error signal than previously to result in a sufficient negative voltage reduction on resistor 80 to result in transistor 81 becoming more conductive and transistor 84 becoming less conductive. Therefore when the resultant voltage on conductor 65 of amplifier 64 is positive at all times, there is no negative control signal to field effects transistor 81, and it has its maximum conduction resulting consequently in transistor 84 becoming less conducting. With transistor 84 less conducting conductor 87 has its maximum output and the altitude hold mode is not engaged through switching means 41.

It will thus be apparent that by adjusting the relative values of resistive elements 70, 71 that the level detector of FIG. 2 may be the 2100 foot level detector 19 or the 50 foot level detector 50 of FIG. 1.

Reviewing, when the altitude error is zero, the DC input to amplifier 64 is zero and there is no attenuation of the negative half-cycle of the tracer signal, consequently amplifier 64 has an AC output and the circuit transmits the full negative output. This negative output when applied to the F.E.T. transistor 81 reduces and may cut off entirely the conduction thereof. Consequently, the conduction in the NPN transistor 84 is large, but the altitude hold mode assumed previously engaged remains engaged.

When the altitude error, however, is greater than say 50 feet, the positive DC signal on amplifier 64 exceeds the negative half cycle for the tracer square wave signal. There is no AC output from high gain amplifier 64, and the DC output therefrom is blocked by capacitor 77. Consequently, with no voltage applied to resistor 80, the conduction of field effects transistor 81 is large. The conduction of transistor 84 consequently is small or none and the altitude hold mode is not automatically engaged.

In the third situation again considering detector 50 when the altitude error while positive is less than 50 feet but greater than zero this positive signal does not completely cancel the negative half cycle of the tracer input. Since amplifier 64 has a high gain there will be an AC output therefrom. The negative component of the AC output when applied to resistor 80 reduces or terminates conduction of the field effects transistor 81 thus increasing the conduction in transistor 84 and the altitude hold mode is automatically engaged and locked in by operation of the switching means 41 under the control of the output of detector 50, for example.

It is apparent that with respect also to level detector 19 that it has a similar operation when (a) the altitude error is greater than 2100 feet (b) or less than 2100 feet but greater than zero, and (c) when it is zero. As indicated previously the proportioning of resistive elements 71, 70 of voltage divider 69 alters the level at which the level detectors operate.

It will also be apparent on reflection that while positive altitude error signals had been considered above, that the level detectors operate similarly when the altitude error signal is negative. Considering level detector 50, as before, if the altitude error be negative to provide a negative DC signal greater than the signal would be at 50 feet altitude error, such negative DC signal would fully cancel the positive half cycles of the tracer signal. Consequently, amplifier 64 would only have a DC output which is blocked by capacitor 77. Thus no signal is applied to resistor 80 and field effects transistor 81 has full conduction and thus transistor 84 has no conduction and there is no output from conductor 21 that will automatically engage the altitude hold mode.

When the negative altitude error is 50 feet or less but greater than zero, the positive half cycles of the tracer signal are not fully cancelled, and since amplifier 64 has a high gain, it will have an AC output which passes through the capacitor 77. The negative portion of this AC output when applied to resistor 80 and F.E.T. transistor 81 reduces or terminates its conduction so that transistor 84 due to the positive voltage on its base becomes fully conducting. The output on its conductor 21 will result in automatically introducing the altitude hold mode which mode is simultaneously latched in and thus remains even though the altitude error subsequently should exceed 50 feet which altitude error thus provide a negative signal that fully cancels the positive half cycle of the tracer signal.

A similar analysis may be applied to level detector 19 which has a level detection of 2100 feet with respect to automatic introduction of the altitude capture mode through switching means 34.

FIG. 2 also shows an electrical schematic of the computer 20 of FIG. 1 for computing the commanded altitude rate signal $\dot{h}c$ from the altitude error signal supplied thereto as an input. The computer 20 of FIG. 2 comprises a differential amplifier 90 arranged in a feedback circuit having an input conductor 91 connected through a summing resistor 92 to an input source such as conductor 21. This input source thus supplies the altitude error signal to computer 20. Amplifier 90 supplies its output through a resistor 94 to an output terminal 24 which output represents the commanded altitude rate $\dot{h}c$ for the aircraft. Connected in a negative feedback path from output terminal 24 is a conductor 98 and resistor 97 to input conductor 91. Also connected in a positive feedback path to a second input of differential amplifier 90 and extending from the output terminal 24 are conductor 100, limiter 101, resistor 102, conductor 103.

Limiter 101 consists of two pairs of diodes connected in forward conducting relation. A positive 15-volt source is connected through a resistor 105 to one end of each of the two pairs of diodes and another end of the two pairs of diodes is connected through a resistor 104 to a negative 15-volt source. One end of conductor 100 extends to a junction of the diodes of one pair and resistor 102 extends from a junction of the two diodes in the other pair. The arrangement is such that limiter 101 will have an output at terminal 108 equal to its input at terminal 107 for voltages applied at terminal 107 below the 15-volt bias voltages.

The operating curve of the computer 20 of FIG. 2 and thus the flight path of the craft is shown in FIG. 3. This graph shows altitude error $\Delta h$ as abscissae and commanded altitude rate $\dot{h}c$ as ordinates. When the altitude error is 2100 feet, the commanded altitude rate is at its maximum which is in this instance 7000 feet per minute. As the altitude error decreases, the commanded altitude rate also decreases. This decrease is in a generally linear relationship. The graph does not pass through the origin. However, as the altitude error decreases to zero, the altitude rate commanded does not decrease to zero, but has a finite value. In other words, when the altitude error reduces toward zero causing the apparatus through level detector 50 to introduce the altitude hold mode with $\Delta h$ and $\dot{h}a$ as control signals, the aircraft still had a finite commanded altitude rate signal thus insuring that the aircraft will pass at least once through the selected altitude. Attaining the selected altitude might not necessarily occur if the graph passed through the origin with altitude hold engaged at 50 feet short of the selected altitude. As the polarity of the altitude error signal reverses after the craft passes through the desired altitude the resulting altitude rate $\dot{h}a$ decreases and reverses in sign. At this time, the phase or sense of the altitude error signal and the altitude rate as sensed are again also opposed and tend to reduce the altitude error.

It will now be apparent that we have provided a novel altitude control apparatus whereby a predetermined altitude may be selected and the aircraft set at a desired initial rate of climb to the selected altitude and that during such climb a desired altitude rate command is computed and compared with the aircraft actual altitude rate and when the aircraft is within a predetermined altitude error and the commanded altitude rate and the actual aircraft altitude are equal and opposite that the initial rate of climb of the aircraft is now modified by the altitude rate error signal. Further, that when the aircraft reaches the selected altitude, or is within a desired distance away from such altitude, that the altitude hold mode is substituted for the altitude capture mode and that the aircraft is thereafter controlled from the craft sensed altitude error and the craft altitude rate signal. By means of the altitude capture mode of control, the aircraft rapidly approaches the desired or selected altitude, and the provisions for having the aircraft flying at an altitude rate even when the altitude error goes to zero insures that the aircraft will attain the selected altitude.

What is claimed is:

1. In position control apparatus for a dirigible craft, first operable signal means for selecting a future predetermined position for the craft; second operable means for selecting a rate of change of position for the craft; sensing means responsive to the actual position of the craft; further means providing an actual position change rate signal; third signal means positioned from the first and sensing means providing an output in accordance with the position error or the change in position of the craft remaining to attain the selected or predetermined position and supplying a commanded position change rate signal; detector means responsive to a predetermined position error and supplying an output; fourth signal means responsive to the further means and third signal means comparing the craft actual position change rate signal and the commanded position change rate signal providing a position rate error signal; and fifth means responsive to the output of the detector means and to the fourth signal means causing thereafter control of the position change rate of the craft by the position rate error signal from the fourth means.

2. The apparatus of claim 1 wherein the third means supplies a commanded position change rate signal even when the position error or change in actual position of the craft remaining to attain the selected position is reduced to zero.

3. The apparatus of claim 1 wherein the position and the rate of change of position signals are altitude and altitude rate.

4. The apparatus of claim 1, wherein the detector means comprises a level detector transmitting an output only when receiving predetermined magnitudes of ($\Delta h$) or the change in position of the craft remaining to attain the selected position and said third means is a variable commanded position change rate computer receiving, and thus controlled by, the magnitude of the altitude error signal.

5. The apparatus of claim 4, and sixth means including a second detector responsive to the first and sensing means and thus to an initial finite output ($\Delta h$) substituting thereafter all magnitudes of $\Delta h$ as the output therefrom for the signal from the fourth means transmitted by the fifth means.

6. The apparatus of claim 4, wherein the output $\dot{h}c$ from the commanded position change rate computer when plotted against inputs ($\Delta h$) to the computer intersects its own axis, for zero inputs of ($\Delta h$) to the computer, at other than the zero of the coordinates and thus has a finite magnitude when ($\Delta h$) is zero.

7. In control apparatus for an aircraft:
first operable signal means for selecting a future displacement for the craft;
second means for selecting a rate of change of displacement for the craft;
third means including means sensing craft displacement and operated by the first means thereby operating in accordance with the displacement error ($\Delta h$) or the change in displacement of the craft remaining to attain the desired displacement and supplying a commanded displacement change rate signal ($\dot{h}c$);
fourth means providing craft displacement rate ($\dot{h}a$) and comparing the craft actual displacement rate $\dot{h}a$ and commanded displacement rate ($\dot{h}c$);
fifth operable means responsive to the fourth means and transmitting the output ($\dot{h}c-\dot{h}a$) of the fourth means after the output of the fourth means is within a predetermined magnitude and the displacement error ($\Delta h$) or change in displacement of the craft remaining to attain the selected displacement also is within a predetermined magnitude; and
means receiving said output of the fifth means.

8. The apparatus of claim 7, and sixth means transmitting a signal ($\Delta h$), in accordance with the change in displacement of the craft remaining to attain the selected displacement, to said receiving means and rendering ineffective the transmission of the signal from the fourth means to the receiving means through the fifth means.

9. The apparatus of claim 8 wherein the receiving means controls the operation of an automatic pilot to position attitude control means of an aircraft.

10. The apparatus of claim 9, wherein the second means operates said control surface independently of said automatic pilot.

References Cited

UNITED STATES PATENTS 3,167,276   1/1965   Moosbrugger et al.
3,240,446   3/1966   Miller.

MILTON BUCHLER, Primary Examiner

J. L. FORMAN, Assistant Examiner